(12) United States Patent
Chang et al.

(10) Patent No.: US 8,711,225 B2
(45) Date of Patent: Apr. 29, 2014

(54) IMAGE-CAPTURING DEVICE AND PROJECTION AUTOMATIC CALIBRATION METHOD OF PROJECTION DEVICE

(71) Applicants: Kun-Rong Chang, Hsin-Chu (TW); Wen-Wei Tsai, Hsin-Chu (TW)

(72) Inventors: Kun-Rong Chang, Hsin-Chu (TW); Wen-Wei Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 13/736,073

(22) Filed: Jan. 8, 2013

(65) Prior Publication Data

US 2013/0258116 A1    Oct. 3, 2013

(30) Foreign Application Priority Data

Mar. 27, 2012 (CN) .......................... 2012 1 0084406

(51) Int. Cl.
  *H04N 17/00* (2006.01)
  *H04N 17/02* (2006.01)
(52) U.S. Cl.
  USPC ........... 348/180; 348/187; 348/188; 348/189; 348/184; 348/191; 348/177; 348/175; 348/333.09; 348/49; 348/47; 348/48; 348/64; 348/705; 348/744; 345/175; 345/178; 353/69
(58) Field of Classification Search
  USPC ......... 348/180, 187, 177, 184, 189, 188, 191, 348/175, 135, 158, 159, 47, 48, 64, 333.09, 348/705, 706, 744; 345/175, 178; 353/69
  See application file for complete search history.

(56) References Cited

U.S. PATENT DOCUMENTS

| 5,513,276 | A  | * | 4/1996  | Theodoracatos | ............. 382/154 |
| 7,023,472 | B1 | * | 4/2006  | Kang et al.   | .................... 348/187 |
| 7,084,386 | B2 | * | 8/2006  | Bernardini et al. | ........... 250/216 |
| 7,215,362 | B2 | * | 5/2007  | Klose         | ............................ 348/189 |
| 7,479,982 | B2 | * | 1/2009  | Otani et al.  | .................... 348/188 |
| 7,808,525 | B2 | * | 10/2010 | Katayama      | ..................... 348/175 |
| 8,339,464 | B2 | * | 12/2012 | Germain       | ....................... 348/189 |
| 2002/0018139 | A1 | * | 2/2002 | Yamagata     | ................ 348/333.09 |
| 2003/0210230 | A1 |   | 11/2003 | Waters       | |
| 2004/0070669 | A1 | * | 4/2004 | Aoyama       | ....................... 348/187 |
| 2009/0138233 | A1 | * | 5/2009 | Kludas et al. | ................. 702/158 |
| 2010/0141775 | A1 | * | 6/2010 | Vogel         | ............................. 348/187 |
| 2011/0157353 | A1 | * | 6/2011 | Takayama et al. | ............ 348/135 |
| 2011/0169778 | A1 |   | 7/2011 | Nungester et al. | |

FOREIGN PATENT DOCUMENTS

TW        578031       3/2004
TW      201020862      6/2010

* cited by examiner

*Primary Examiner* — Jefferey Harold
*Assistant Examiner* — Mustafizur Rahman
(74) *Attorney, Agent, or Firm* — Jianq Chyun IP Office

(57) ABSTRACT

An image-capturing device and a projection automatic calibration method of a projection device are provided. The image-capturing device includes an image sensing device, a lens, a processing unit and a storage unit. The lens is configured to image a calibration pattern on the image sensing device. The processing unit is configured to issue a projection calibration requirement and analyze the calibration pattern imaged on the image sensing device to obtain information relating to the calibration pattern, and the processing unit is further configured to convert imaging coordinates of the calibration pattern imaged on the image sensing device into projecting coordinates of the projection device by executing a calibration driving program to establish a coordinate conversion table. The storage unit is configured to store the calibration driving program and the coordinate conversion table.

16 Claims, 4 Drawing Sheets

IMAGE-CAPTURING DEVICE AND PROJECTION AUTOMATIC CALIBRATION METHOD OF PROJECTION DEVICE

CROSS-REFERENCE TO RELATED APPLICATION

This application claims the priority benefit of China application serial no. 201210084406.3, filed on Mar. 27, 2012. The entirety of the above-mentioned patent application is hereby incorporated by reference herein and made a part of this specification.

BACKGROUND OF THE INVENTION

1. Field of the Invention

The invention relates to an image-capturing device, and more particularly, to an image-capturing device capable of automatically calibrating parameters of projection frames projected by a projection device.

2. Description of Related Art

With the progress in science and technology, the applications of infrared interactive projection system have gradually been increased, for example, electronic whiteboards and video games (such as Wii) are commonly used in daily life. In general, during the calibration between a projection device and an image-capturing device in the infrared interactive projection system is performed, for example, the user uses an infrared touch pen to touch some specific areas on the projection screen, such that the infrared interactive projection system may calculate the size and the resolution of the current projected image according to the touching behavior of touching these specific areas with the infrared touch pen, thereby adjusting the image-capturing device for the detection of a touch location. However, since the above-described calibration operation is performed by a manual approach and potentially due to the inaccurate touching behavior on the specific areas from the user, the infrared interactive projection system may generate errors in the operation for calculating the size and the resolution of the current projected image, thereby causing an inaccurate calibration result.

Taiwan Patent Publication No. 201020862 discloses a human-machine interactive manipulation system including a projector, an infrared emitting unit, an image-capturing unit and a processing unit. The projector produces a projection surface, and the infrared emitting unit generates a light spot onto the projection surface. The image-capturing unit is disposed with a filter for filtering out the visible light to obtain a distinct captured image. The processing unit is electrically connected with the projector and the image-capturing unit to perform the light spot detection for captured image information, so as to obtain the light spot location of the captured image information. The processing unit further includes a calibration unit for providing at least one calibration point on the projection surface and calculating location calibration parameters according to the calibration point location on the projection surface and the light spot location on the captured image information.

Taiwan Issued Patent No. 578031 discloses a projection system including a projector, an image-capturing device and a data processor. A light source of the projector is split into a visible light and an invisible light via a beam splitter. A picture image of the data processor is generated after the visible light part is modulated by a second imaging element, and a particular pattern is generated after the invisible light part is modulated by a first imaging element. The modulated visible light and the modulated invisible light are collected by a prism to form a light beam, and the light beam is projected onto the screen through a lens. The image-capturing device is utilized to sense the invisible light, and the particular pattern formed by the first imaging element is for providing the image-capturing device to capture variant patterns at different time points, so as to serve as the basis for calculating the movement direction and the movement amount of a cursor.

U.S. Patent Publication No. 2011/0169778 discloses an interactive projection system including a projection unit, a sensor and a computing device. The sensor with a photosensitive element may be utilized to detect the infrared light. When the projection system is calibrated, firstly, a calibration image is projected onto the screen, and the calibration image has calibration points at different locations respectively. The user uses a light stylus to emit the infrared light to each calibration point, in order for the infrared light to be reflected to the sensor. The sensor then may obtain each of the calibration points corresponding to the locations of the screen. The computing device receives the location information of the calibration points and converts them into coordinates, and adjusts the image outputted from the projection unit according to the coordinates.

U.S. Patent Publication No. 2003/0210230 discloses an invisible beam pointer system including a display screen, a sensor, a projector coupled to the sensor and an infrared pointer device. The projector may be connected with a processor to receive information. When the projector projects out an image frame, the user may drive the infrared pointer device to emit an infrared light to a certain location. The infrared light is reflected by the screen and received by the sensor, so as to obtain coordinate information of the location. After the coordinate information is transmitted to the projector, the image processor in the projector modifies the original image frame to another frame according to the coordinate information, thereby projecting another frame to the screen, such that the pre-calibration system may not be required.

SUMMARY OF THE INVENTION

Accordingly, the invention is directed to an image-capturing device and a projection automatic calibration method of a projection device, which may automatically complete an entire calibration operation without performing the calibration operation by a manual approach, during the calibration operation for imaging coordinates of the image-capturing device and projecting coordinates of the projection device in an infrared interactive projection system is performed, thereby avoiding an inaccurate calibration result caused by the manual calibration operation.

Other objects and advantages of the invention may be further comprehended by reading the technical features described in the invention as follows.

In order to achieve one of, a part of or all of the above-mentioned objects, or to achieve other objects, an embodiment of the invention provides an image-capturing device including an image sensing device, a lens, a processing unit and a storage unit. The lens is configured to image the calibration pattern on the image sensing device. The processing unit is configured to issue the projection calibration requirement and analyze the calibration pattern imaged on the image sensing device to obtain information relating to the calibration pattern, and the processing unit further configured to convert imaging coordinates of the calibration pattern imaged on the image sensing device into projecting coordinates of the projection device by executing a calibration driving program to establish a coordinate conversion table. The storage unit is configured to store the calibration driving program and the coordinate conversion table.

In an embodiment of the invention, the image-capturing device further includes a filtering element. The filtering element is configured to adjust an acceptable light wavelength range received by the image sensing device, from a visible light range to an invisible light range according to a switching signal, after the coordinate conversion table is established.

In an embodiment of the invention, a way of adjusting the acceptable light wavelength range received by the image sensing device from the visible light range to the invisible light range by the filtering element may be a mechanical rotating way combined with a rotating axis.

In an embodiment of the invention, a way of adjusting the acceptable light wavelength range received by the image sensing device from the visible light range to the invisible light range by the filtering element may be a mechanical shifting way combined with a track.

In an embodiment of the invention, after the acceptable light wavelength range received by the image sensing device is adjusted to the invisible light range by the filtering element, when a touch operation is captured by the image-capturing device, the image-capturing device converts a touch location of the touch operation into a coordinate location on the projection device according to the coordinate conversion table.

According to another aspect, the invention provides a projection automatic calibration method of a projection device. The projection automatic calibration method includes: capturing and analyzing a calibration pattern projected by the projection device by using an image-capturing device to obtain information of the calibration pattern; and executing a calibration driving program to convert image coordinates of the calibration pattern into projecting coordinates of the projection device to establish a coordinate conversion table accordingly.

In an embodiment of the invention, the invisible light range may be a wavelength range of an infrared light.

In an embodiment of the invention, the calibration pattern may include a plurality of feature areas.

In an embodiment of the invention, the feature areas may be divided into at least two colors, for example: black and white.

According to the above descriptions, the invention provides an image-capturing device and a projection automatic calibration method of a projection device. The image-capturing device may automatically analyze the sizes and the locations of the feature areas in the calibration pattern, through a captured calibration pattern projected by the projection device, so as to obtain information of the actual size and the resolution of the current calibration pattern. Moreover, by comparing the known projection information of the calibration pattern provided by the projection device (such as the resolution and the size of the projected image set inside the projection device) and the actual size of the calibration pattern captured by the image-capturing device, the imaging coordinates of each of the feature areas in the calibration pattern may be converted into the projecting coordinates on the projection device, and a coordinate conversion table is established accordingly. Therefore, when a touch operation is captured by the image-capturing device, a touch location of the touch operation may properly be converted into a corresponding coordinate location on the projection device. Since the calibration operation for converting the imaging coordinates on the image-capturing device into the projecting coordinates on the projection device is performed without the manual approach, a more accurate calibration result may be achieved.

In order to make the features and advantages of the invention more comprehensible, the invention is further described in detail in the following with reference to a preferred (or a plurality of) embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," "left," "right," etc., is used with reference to the orientation of the Figure(s) being described. As such, the directional terminology is applied for purposes of illustration and is not applied to limit the invention.

Figure 1:
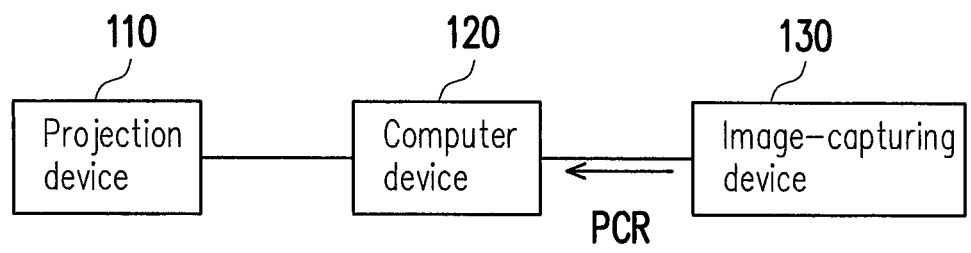
FIG. 1 illustrates a system block diagram of a projection system according to an embodiment of the invention.

FIG. 1 illustrates a system block diagram of a projection system according to an embodiment of the invention. The projection system 100 includes a projection device 110, a computer device 120 and an image-capturing device 130. The projection system 100 may be an infrared interactive projection system, but it is not limited thereto, and which may adopt the image-capturing device 130 to detect (may be a capturing way or a sensing brightness way) a touch operation occurred on an object surface (such as a screen, a wall, a floor, a whiteboard and the like), and then to convert the touch operation into a corresponding operation (such as dragging a window, painting and the like) on the computer device 120, such that the projection device 110 is controlled by the computer device 120 to adjust an image projected by the projection device 110 on the object surface.

During the projection system 100 is set up or after the relative locations between the image-capturing device 130 and the projection device 110 are adjusted, the interactive coordinates between a display frame of the computer device 120 and a projecting frame of the projection device 110 are required to be calibrated, in order for the image-capturing device 130 to have a higher accuracy for, such as, detecting a touch location of the above-described touch operation, thus properly performing an operation that the user is intended to perform on the computer device 120 during a touch operation is captured by the image-capturing device 130, in term of the capturing way. In the process of performing calibration, the image-capturing device 130 may issue a projection calibration requirement PCR to the computer device 120 during communicating with the computer device 120. When the computer device 120 receives the projection calibration requirement PCR, the computer device 120 may control the projection device 110 to project a calibration pattern onto an object surface such as a whiteboard in response to the projection calibration requirement PCR. In other words, in the embodiment, the image-capturing device 130 may communicate with the projection device 110 through the computer device 120.

At this moment, the image-capturing device 130 is capable of capturing this calibration pattern and analyzing the calibration pattern to obtain information (such as the actual size and the resolution of the calibration pattern) related to the current image projected by the projection device 110. Then, the projection device 110 provides a known projection information (such as the resolution and the size of the projected image set inside the projection device 110) through a wireless or wired transmission way, and the image-capturing device 130 may automatically calibrate the interactive coordinates between the display frame of the computer device 120 and the projecting frame of the projection device 110 through the way of image processing. After the calibration operation of the interactive coordinates is completed, when the image-capturing device 130 captures a touch operation on the object surface, a touch location of the touch operation on the object surface may be converted into a corresponding location on the computer device 120, and then performed a corresponding operation.

For example, when the projection device 110 projects a window image of the computer device 120 to the object surface and the user touches, for example, the button for closing the window in the window image on the object surface, the image-capturing device 130 determines that the user here is intended to perform pressing the corresponding location on the computer device 120 such as the action of closing the window by the captured touch location, consequently, the computer device 120 closes the above-described window correspondingly. Afterwards, the computer device 120 controls the projection device 110 again to project the display frame on the computer device 120 to the object surface, in order to achieve the interactive operation.

The projection device 110 may be a pico projector, a single beam projector or other electronic devices with the projecting function. The computer device 120 may be a personal computer, a workstation, a server, a notebook computer, a tablet personal computer or so on. The image-capturing device 130 may be a device with the tracking and detecting functions for an infrared light or other similar optical signals.

Figure 2:
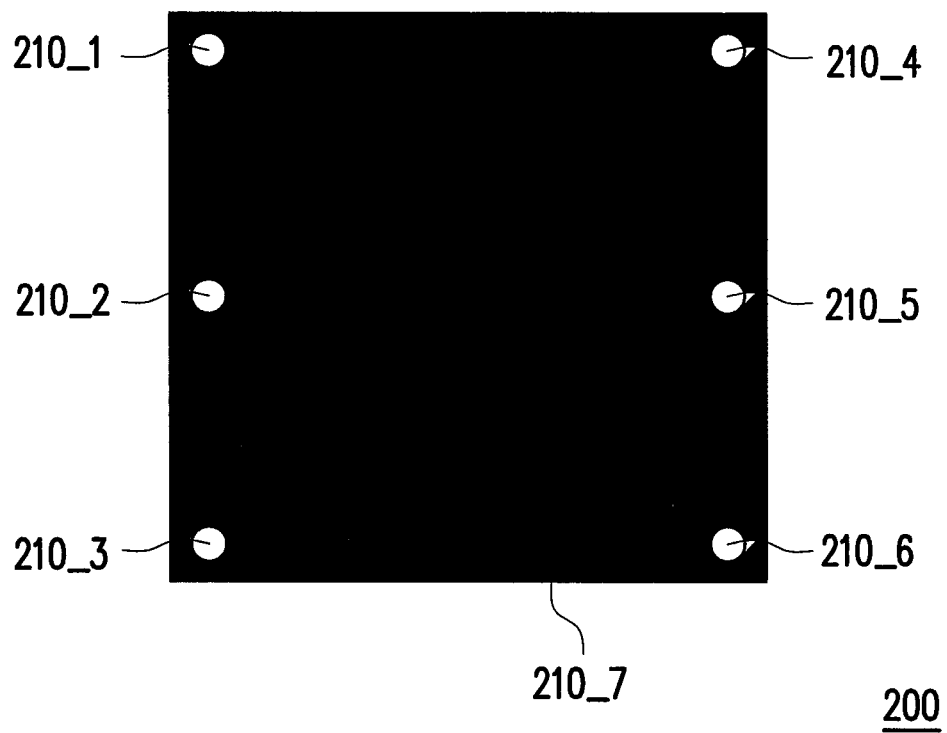
FIG. 2 illustrates a schematic diagram of a calibration pattern according to an embodiment of the invention.

FIG. 2 illustrates a schematic diagram of a calibration pattern according to an embodiment of the invention. The calibration pattern 200 has a plurality of feature areas 210_1~201_7, but it is not limited thereto. The feature areas 210_1~210_6 may be white color and the feature area 210_7 may be black color. When the projection device 110 projects the calibration pattern 200 to the object surface (such as a whiteboard), the image-capturing device 130 may capture the calibration pattern 200, and according to, for example, the sizes of the feature areas 210_1~210_7 and the locations of the feature areas 210_1~210_7 corresponding to the calibration pattern 200, automatically analyze the calibration pattern 200 to obtain the projection information related to the calibration pattern 200 by calculating. The projection information may be the actual frame size and the resolution of the calibration pattern 200, or so on.

Therefore, the calibration pattern 200 is captured and analyzed by the image-capturing device 130, such that the image-capturing device 130 may obtain the projection information of the calibration pattern 200 by itself, so as to automatically calibrate the interactive coordinates between the display frame of the computer device 120 and the projecting frame of the projection device 110 without being performed by the manual approach, thereby reducing the calibration errors caused by the manual approach during the calibration operation. The calibration pattern 200 in the embodiment is applied for purposes of illustration, wherein the size, the quantity and the location of each of the feature areas 210_1~210_7 may all be designed by the user, or may be depended upon the design requirement from the person skilled in the art. In addition, during the setting of the calibration pattern, the feature areas thereof are required to have at least two different colors (such as black and white), such that the image-capturing device 130 may separate the adjacent feature areas (such as the feature area 210_1 and the feature area 210_7) with different colors during the sizes and the locations of the feature areas are analyzed, so as to perform the subsequent analysis operation.

Figure 3A:
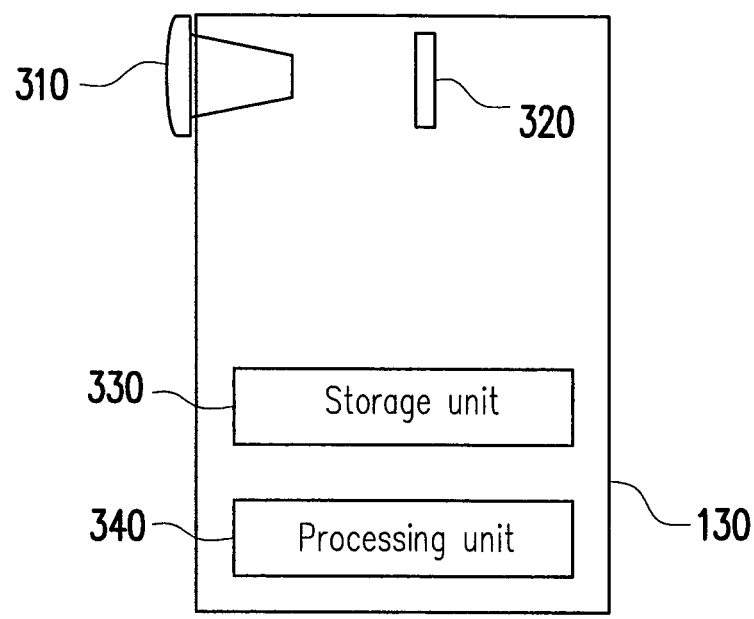
FIG. 3A illustrates a system block diagram of an image-capturing device according to an embodiment of the invention.

FIG. 3A illustrates a system block diagram of an image-capturing device according to an embodiment of the invention. In the embodiment, the image-capturing device 130 includes a lens 310, an image sensing device 320, a storage unit 330 and a processing unit 340. The lens 310 is configured to image a calibration pattern (for example, the calibration pattern 200) on the image sensing device 320. The image sensing device 320 may be a charge coupled device (CCD) or a complementary metal-oxide semiconductor (CMOS), but it is not limited thereto.

During the interactive coordinates between the display frame of the computer device 120 and the projecting frame of the projection device 110 are calibrated, the processing unit 340 may issue the projection calibration requirement PCR to the computer device 120. After the projection calibration requirement PCR is received by the computer device 120, the computer device 120 controls the projection device 110 to project the calibration pattern 200. After the calibration pattern 200 is projected by the projection device 110, the lens 310 of the image-capturing device 130 images the calibration pattern 200 on the image sensing device 320. Next, the processing unit 340 is configured to analyze the sizes of the feature areas 210_1~210_7 in the calibration pattern 200 or the relative locations of the feature areas 210_1~210_7 in the calibration pattern 200, so as to obtain the related information of the actual size and the resolution, etc. of the current presented calibration pattern 200. Then, the processing unit 340 is further configured to execute a calibration driving program, such that the imaging coordinates of the feature areas 201_1~210_7 in the calibration pattern 200 imaged on the image sensing device 320 may be converted into the projecting coordinates on the projection device 110, by comparing the known projection information of the calibration pattern 200 provided by the projection device 110 (such as the information of resolution and size of the projected image inside the projection device) and the actual size of the calibration pattern 200 captured by the image-capturing device 130.

In other words, a one-to-one coordinate conversion relationship may be established between the imaging coordinates on the image sensing device 320 and the projecting coordinates of the projection device 110, by comparing the calibration pattern 200 imaged on the image sensing device 320 in the image-capturing device 130 and the known projection information provided by the projection device 110. Moreover, a coordinate conversion table for converting the imaging coordinates on the image sensing device 320 into the projecting coordinates of the projection device 110 may further be established accordingly.

The storage unit 330 is configured to store such as the above-described calibration driving program, the known projection information provided by the projection device 110 and the coordinate conversion table. The storage unit 330 may be a flash memory, a random access memory (RAM), a static random access memory (SRAM), a dynamic random access memory (DRAM) or the like, but it is not limited thereto. The processing unit may be a central processing unit (CPU) or other programmable microprocessors.

Figure 3B:
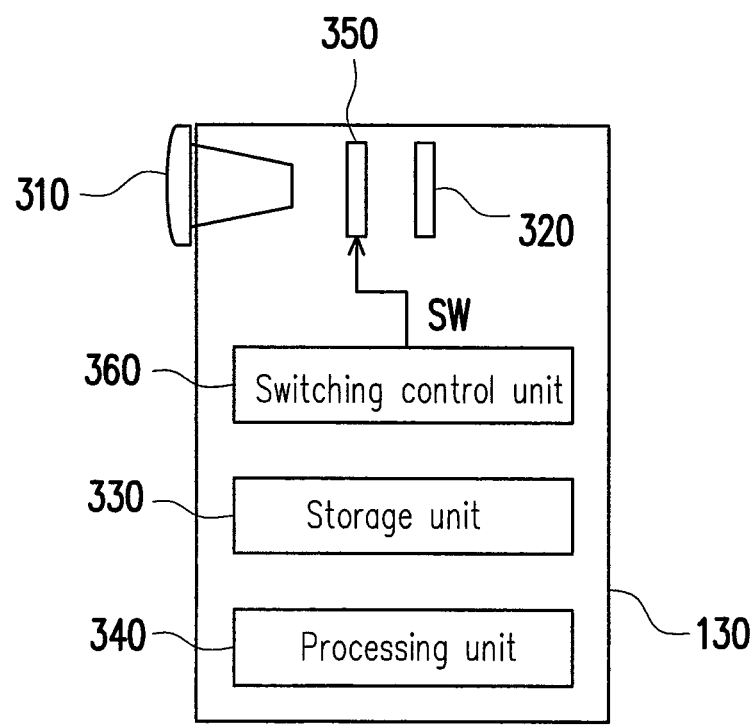
FIG. 3B illustrates a system block diagram of an image-capturing device according to an embodiment of the invention.

FIG. 3B illustrates a system block diagram of an image-capturing device according to an embodiment of the invention. In the embodiment, the image-capturing device 130 further includes a filtering element 350 and a switching control unit 360. After an automatic calibration operation for the interactive coordinates between the display frame of the computer 120 and the projection device 110 is completed and the coordinate conversion table is established, at this moment, the image-capturing device 130 may begin to detect for a touch operation. In general, the touch operation may be implemented by, for example, an element of an infrared touch pen (not shown), and in order for the infrared signal emitted from the infrared touch pen to be detected, the switching control unit 360 may transmit a switching signal SW to control the filtering element 350 to adjust an acceptable light wavelength range received by the image sensing device 320. The filtering element 350 may be a filter, which is capable of filtering out a visible light and only allowing the light of an infrared signal to pass through. Therefore, when the filtering element 350 is disposed on a transmission path of the light between the lens 310 and the image sensing device 320, the filtering element 350 may adjust the acceptable light wavelength range received by the image sensing device 320, from the visible light range to, for example, the invisible light range of an infrared wavelength range.

Therefore, during the projection system 100 is set up, the image-capturing device 130 may automatically convert the detected touch location of the touch operation into the coordinate location on the projection device 110, through the calibration operation for the interactive coordinates between the display frame of the computer device 120 and the projecting frame of the projection device 110 and the operation for converting the touch locations into the coordinate locations on the projection device 110 performed in the image-capturing device 130, thereby controlling the image content projected by the projection device 110 through the computer device 120. Since the calibration driving program is built in the storage unit 330 of the image-capturing device 130, the above-described operation does not need to install a driving program on the computer device 120 for converting the imaging coordinates on the image-capturing device 130 into the projecting coordinates of the projection device 110, such that the image-capturing device 130 may achieve the effect of "plug and play" during being connected to the computer device 120 or the projection device 110.

Figure 4A:
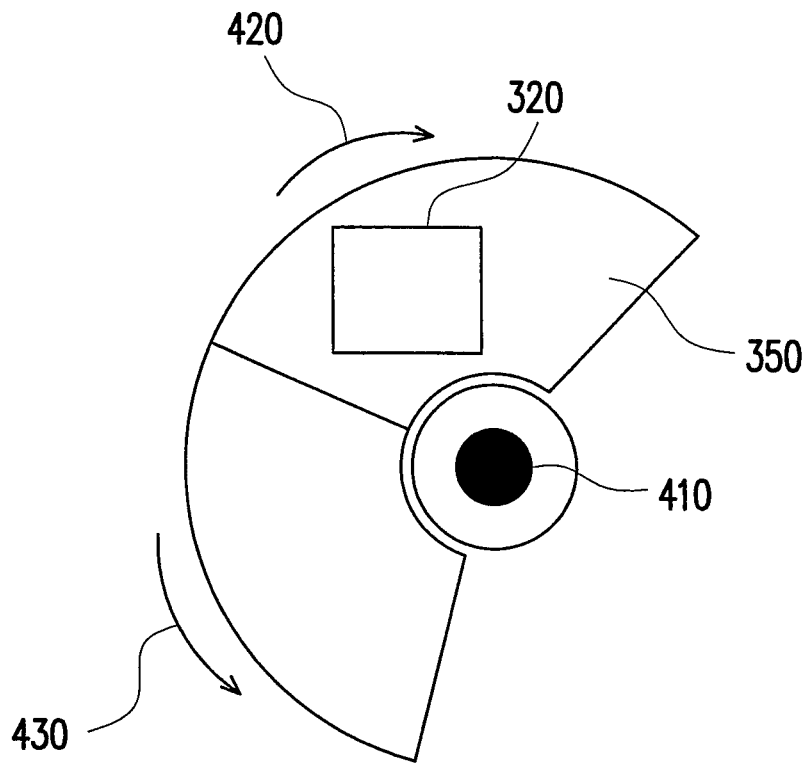
FIG. 4A illustrates a schematic diagram of an operation for adjusting a filtering element according to an embodiment of the invention.

FIG. 4A illustrates a schematic diagram of an operation for adjusting a filtering element according to an embodiment of the invention. In the embodiment, an adjusting way for a location of the filtering element 350 may be implemented by a mechanical rotating way combined with a rotating axis 410. During the calibration operation for the interactive coordinates between the display frame of the computer device 120 and the projection device 110 is performed, the image sensing device 320 needs to receive the light within a visible light wavelength range to capture the calibration pattern, at this moment, the switching signal SW of the switching control unit 360 may control the rotating axis 410 to move away the filtering element 350 along, for example, a clockwisely rotating direction of a direction 420, such that the image sensing device 320 may receive the light within the visible light wavelength range. However, after the calibration operation for the interactive coordinates between the computer device 120 and the projection device 110 is completed, the switching signal SW of the switching control unit 360 may control the rotating axis 410 to move the filtering element 350 to a position in front of the image sensing device 320 along, for example, a counterclockwisely rotating direction of a direction 430, such that the image sensing device 320 may receive, for example, the light within an invisible light wavelength range of an infrared light.

Figure 4B:
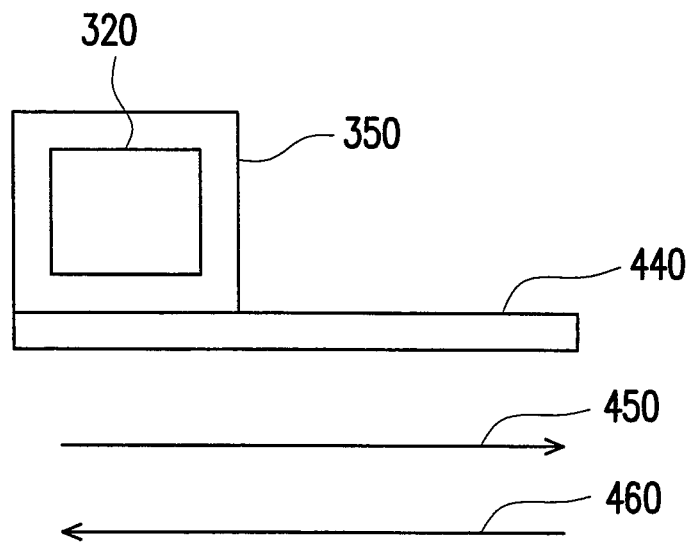
FIG. 4B illustrates a schematic diagram of an operation for adjusting a filtering element according to an embodiment of the invention.

FIG. 4B illustrates a schematic diagram of an operation for adjusting a filtering element according to an embodiment of the invention. In the embodiment, an adjusting way for a location of the filtering element 350 may be implemented by a mechanical shifting way combined with a track 440. During the calibration operation for the interactive coordinates between the display frame of the computer device 120 and the projection device 110 is performed, the image sensing device 320 needs to receive the light within a visible light wavelength range to capture the calibration pattern, at this moment, the switching signal SW of the switching control unit 360 may control the filtering element 350 on the track 440 to move away along, for example, a shifting direction of a direction 450, such that the image sensing device 320 may receive the light within the visible light wavelength range. However, after the calibration operation for the interactive coordinates between the computer device 120 and the projection device 110 is completed, the switching signal SW of the switching control unit 360 may control the filtering element 350 on the track 440 to move to a position in front of the image sensing device 320 along, for example, a shifting direction of a direction 460, such that the image sensing device 320 may receive, for example, the light within an invisible light wavelength range of an infrared light.

In an embodiment, the communication between the projection device 110 and the computer device 120 may be a wired transmission way through, for example, a video graphics array (VGA) transmission cable, and the communication between the computer device 120 and the image-capturing device 130 may be a wired transmission way through, for example, an universal serial bus (USB).

In another embodiment, the projection device 110 may include a first wireless communication module, and the computer device 120 may include a second wireless communication module. In the embodiment, the image-capturing device 130 may communicate with the projection device 110 through a wired transmission way through, for example, an USB, and the projection device 110 may communicate, via the first wireless communication module, with the second wireless communication module on the computer device 120 through a wireless transmission way, for example, Bluetooth or wireless fidelity (Wi-Fi). In the embodiment, the image-capturing device 130 may communicate with the computer device 120 through the projection device 110. When the image-capturing device 130 is desired to issue the projection calibration requirement PCR to the computer device 120, firstly, the image-capturing device 130 may issue the projection calibration requirement PCR to the projection device 110, and then the projection calibration requirement PCR is issued to the computer device 120 via the projection device 110. After the projection calibration requirement PCR is received by the computer device 120, the projection device 110 is controlled to project the calibration pattern.

In addition, the image-capturing device 130 may also include a third wireless communication module. Therefore, a way of communicating to each other between the projection device 110, the computer device 120 and the image-capturing device 130 may all be utilized a wireless transmission way, for example, Bluetooth or Wi-Fi, to communicate to each other through the first, the second and the third wireless communication modules. The above-described wired and wireless transmission ways are applied for purposes of illustration, which may be designed by the user, or may be depended upon the design requirement from the person skilled in the art.

Figure 5:
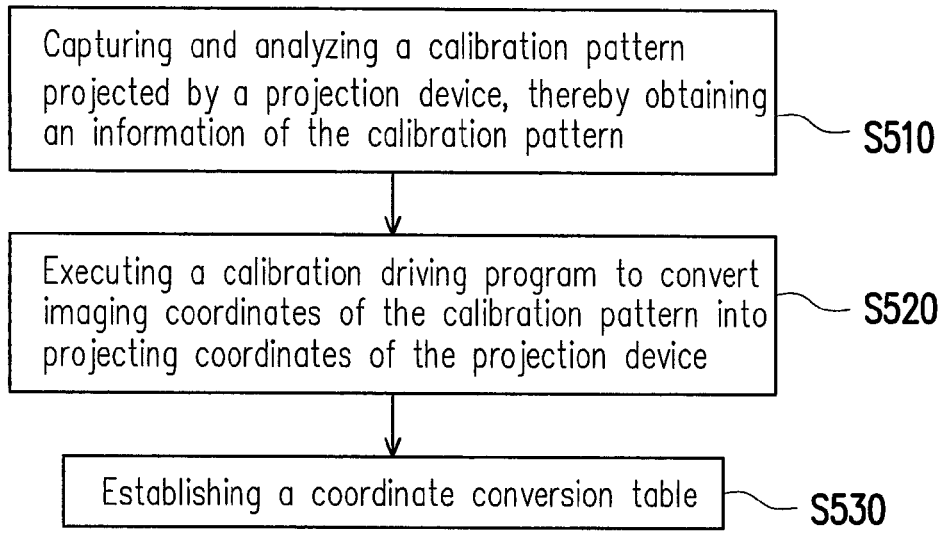
FIG. 5 illustrates a flow chart of a projection automatic calibration method according to an embodiment of the invention.

According to the content disclosed/taught by the above embodiments, FIG. 5 illustrates a flow chart of a projection automatic calibration method according to an embodiment of the invention. Referring to FIG. 5, in the embodiment, when the projection device projects a calibration pattern to an object surface, the image-capturing device captures and analyzes the calibration pattern, so as to obtain information of the calibration pattern, for example, the actual size and the resolution of the calibration pattern, etc. (step S510). Next, the image-capturing device executes a calibration driving program to convert the imaging coordinates of the calibration pattern into the projecting coordinates of the projection device (step S520). After the above-described imaging coordinates and the projecting coordinates are converted, the image-capturing device may establish a coordinate conversion table according to a one-to-one relationship between the imaging coordinates and the projecting coordinates (step S530).

Figure 6:
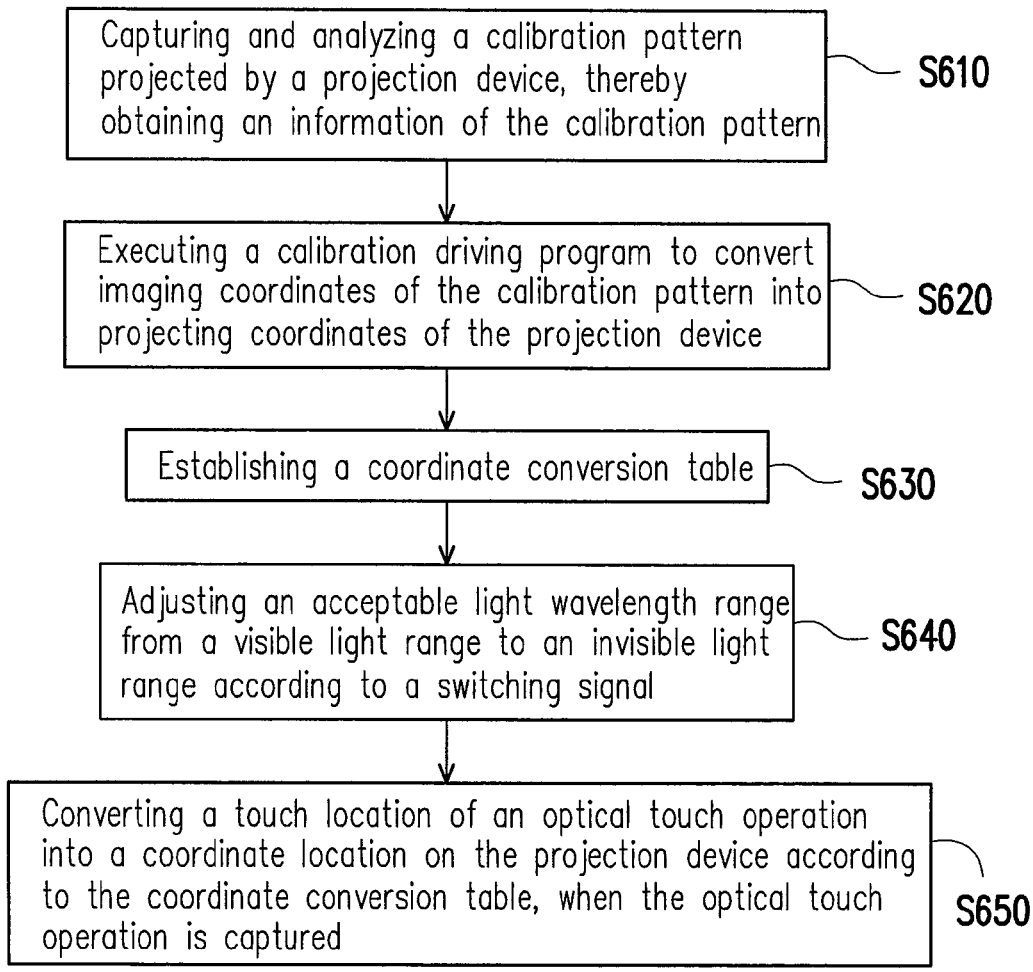
FIG. 6 illustrates a flow chart of a projection automatic calibration method according to another embodiment of the invention.

FIG. 6 illustrates a flow chart of a projection automatic calibration method according to another embodiment of the invention. Referring to FIG. 6, in the embodiment, actions performed in steps S610 to S630 are the same as steps S510 to S530. The difference between the embodiments in FIGS. 5 and 6 is that, in FIG. 6, after the coordinate conversion table is established (step S630), since the image-capturing device here is required to be adjusted to detect (viz., capturing) such as a touch operation for touching the object surface with the infrared touch pen, an acceptable light wavelength range received by itself is also required to be adjusted correspondingly. Consequently, a filtering element in the image-capturing device may adjust the acceptable light wavelength range received by the image-capturing device, from a visible light range to, for example, an invisible light range of an infrared wavelength range according to a switching signal (step S640). Afterwards, when the touch operation is captured by the image-capturing device, a touch location of the touch operation may be converted into a coordinate location on the projection device according to the coordinate conversion table (step S650). The details of the above-described steps may be referenced to the description of embodiments in FIG. 1, FIG. 2, FIG. 3B, FIG. 4A and FIG. 4B, which may not be described herein again.

In summary, the invention provides an image-capturing device and a projection automatic calibration method of a projection device. The image-capturing device may automatically analyze the sizes and the locations of the feature areas in the calibration pattern, through a captured calibration pattern projected by the projection device, so as to obtain information of the actual size and the resolution of the current calibration pattern. Moreover, by comparing the known projection information of the calibration pattern provided by the projection device (such as the resolution and the size of the projected image set inside the projection device) and the actual size of the calibration pattern captured by the image-capturing device, the imaging coordinates of each of the feature areas in the calibration pattern may be converted into the projecting coordinates on the projection device, and a coordinate conversion table is established accordingly. Therefore, when a touch operation is captured by the image-capturing device, a touch location of the touch operation may properly be converted into a corresponding coordinate location on the projection device. Since the calibration operation for converting the imaging coordinates on the image-capturing device into the projecting coordinates on the projection device is performed without the manual approach, a more accurate calibration result may be achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An image-capturing device, comprising:
   an image sensing device;
   a lens, configured to image a calibration pattern on the image sensing device;
   a processing unit, configured to issue a projection calibration requirement and analyze the calibration pattern imaged on the image sensing device to obtain information relating to the calibration pattern, and the processing unit further configured to convert imaging coordinates of the calibration pattern imaged on the image sensing device into projecting coordinates of a projection device by executing a calibration driving program to establish a coordinate conversion table;

a storage unit, configured to store the calibration driving program and the coordinate conversion table; and a filtering element, configured to adjust an acceptable light wavelength range received by the image sensing device, from a visible light range to an invisible light range according to a switching signal, after the coordinate conversion table is established.

2. The image-capturing device as claimed in claim 1, wherein the invisible light range is a wavelength range of an infrared light.

3. The image-capturing device as claimed in claim 1, wherein a way of adjusting the acceptable light wavelength range received by the image sensing device from the visible light range to the invisible light range by the filtering element is a mechanical rotating way combined with a rotating axis.

4. The image-capturing device as claimed in claim 1, wherein a way of adjusting the acceptable light wavelength range received by the image sensing device from the visible light range to the invisible light range by the filtering element is a mechanical shifting way combined with a track.

5. The image-capturing device as claimed in claim 1, wherein after the acceptable light wavelength range received by the image sensing device is adjusted to the invisible light range by the filtering element, when a touch operation is captured by the image-capturing device, the image-capturing device converts a touch location of the touch operation into a coordinate location on the projection device according to the coordinate conversion table.

6. The image-capturing device as claimed in claim 1, wherein the calibration pattern comprises a plurality of feature areas.

7. The image-capturing device as claimed in claim 6, wherein the plurality of feature areas are divided into at least two colors.

8. The image-capturing device as claimed in claim 7, wherein the colors comprise black and white.

9. A projection automatic calibration method of a projection device, comprising:

capturing and analyzing a calibration pattern projected by the projection device by using an image-capturing device to obtain information of the calibration pattern;

executing a calibration driving program to convert image coordinates of the calibration pattern into projecting coordinates of the projection device to establish a coordinate conversion table accordingly; and adjusting an acceptable light wavelength range received by the image-capturing device, from a visible light range to an invisible light range according to a switching signal, after the coordinate conversion table is established.

10. The projection automatic calibration method of the projection device as claimed in claim 9, wherein the invisible light range is a wavelength range of an infrared light.

11. The projection automatic calibration method of the projection device as claimed in claim 9, wherein a way of adjusting the acceptable light wavelength range received by the image-capturing device from the visible light range to the invisible light range is a mechanical rotating way combined with a rotating axis.

12. The projection automatic calibration method of the projection device as claimed in claim 9, wherein a way of adjusting the acceptable light wavelength range received by the image-capturing device from the visible light range to the invisible light range is a mechanical shifting way combined with a track.

13. The projection automatic calibration method of the projection device as claimed in claim 9, wherein after the acceptable light wavelength range received by the image-capturing device is adjusted from the visible light range to the invisible light range, when a touch operation is captured, a touch location of the touch operation is converted into a coordinate location on the projection device according to the coordinate conversion table.

14. The projection automatic calibration method of the projection device as claimed in claim 9, wherein the calibration pattern comprises a plurality of feature areas.

15. The projection automatic calibration method of the projection device as claimed in claim 14, wherein the plurality of feature areas are divided into at least two colors.

16. The projection automatic calibration method of the projection device as claimed in claim 15, wherein the colors comprise black and white.

* * * * *